United States Patent [19]

Ushirozawa

[11] Patent Number: 5,539,570
[45] Date of Patent: Jul. 23, 1996

[54] MONITORING STATE OF OPTICAL ELEMENTS IN AN OPTICAL AMPLIFIER

[75] Inventor: Mizuyuki Ushirozawa, Tokyo, Japan

[73] Assignee: NEC Corporation, Tokyo, Japan

[21] Appl. No.: 407,709

[22] Filed: Mar. 21, 1995

[51] Int. Cl.[6] .................................................. H01S 3/00
[52] U.S. Cl. .............................. 359/341; 359/177
[58] Field of Search ................................... 359/177, 341

[56] References Cited

U.S. PATENT DOCUMENTS

| | | | |
|---|---|---|---|
| 5,101,461 | 3/1992 | Nakajima | 385/42 |
| 5,268,786 | 12/1993 | Matsushita et al. | 359/341 |
| 5,291,326 | 3/1994 | Heidemann | 359/160 |
| 5,299,048 | 3/1994 | Suyama | 359/179 |
| 5,374,973 | 12/1994 | Maxham et al. | 359/341 |

FOREIGN PATENT DOCUMENTS

| | | |
|---|---|---|
| 3-7917 | 1/1991 | Japan . |
| 4-1614 | 1/1992 | Japan . |
| 4-277687 | 10/1992 | Japan . |

*Primary Examiner*—Mark Hellner
*Attorney, Agent, or Firm*—Foley & Lardner

[57] ABSTRACT

In a method of monitoring an optical amplifier in an optical communication system, an optical signal is optically amplified in response to a drive current by an optical amplifier which includes at least one optically active element and a group of optically passive elements including a rare earth element doped optical fiber. The intensity of light emitted from the optically active element is monitored to generate a first monitor signal indicative of the intensity of light emitted from the optically active element. Also, the optical fiber is monitored for an optical amplification of the optical amplifier. The drive current is supplied to the optical amplifier based on the second monitor signal. The states of the optically active element and the group of optically passive elements are determined based on the first monitor signal and a second monitor signal corresponding to the drive current.

13 Claims, 6 Drawing Sheets

DEGRADATION

10001    P

15300    A

FAILURE

10010    A

10020    A

MONITORING STATE OF OPTICAL ELEMENTS IN AN OPTICAL AMPLIFIER

BACKGROUND OF THE INVENTION

1. Field of the Invention

The present invention relates to an optical communication system, and more particularly to monitoring the states of optical elements in an optical amplifier used in an optical communication system and informing degradation or failure of the optical elements.

2. Description of Related Art

Recently, an optical communication system has been developed for necessity of transmission of a large amount of data. In the optical communication system, since an optical signal attenuated on the way of transmission, it is necessary to be amplified by an optical amplifier provided at an optical relay point or an exchange station. If the optical amplifier fails, the optical signal is not amplified so that correct communication cannot be achieved. Therefore, information of degradation or failure of the optical elements are required for correct amplification of the optical signal.

A conventional amplifier unit will be described below with reference to FIG. 1. Referring to FIG. 1, the optical amplifier unit includes a rare earth element doped optical fiber 201 which is connected to normal or undoped optical fibers 211 and 212. Optical filters 205 are provided between the optical fibers 211 and 201 and between the optical fibers 201 and 212. As described above, the optical fiber 201 is doped with rare earth element such as neodymium (Nd) and erbium (Er). The optical characteristic of optical fiber 201 is shown in the Japanese Laid Open Patent Disclosure (JP-A-hei 3-7917). In this reference, such an optical fiber is used to separate a desired optical signal from a transmitted signal. A light emitting element 202 such as a semiconductor laser emits light in accordance with a drive current from a drive circuit 220 and the emitted light is amplified by an amplifier 203 such as another semiconductor laser. The amplified light by the amplifier 203 is supplied and coupled to the optical fiber 201 by an optical coupler 204 via a filter 218. Thus, the optical signal input from the optical fiber 211 to the optical fiber 201 is amplified. Such an optical amplifier is disclosed in, for example, the Japanese Laid Open Patent Disclosure (JP-A-Hei4-1614). The filter 218 is provided to prevent the light from being supplied from the optical fiber 201 to the optical semiconductor laser 203. A signal indicative of the level of drive current is supplied from the drive circuit 220 to a monitor circuit 224. The monitor circuit 224 determines the states of optical elements based on the signal from the drive circuit 220. In this case, when the drive current is increased 1.5 times more than an initial drive current, the monitor circuit 224 determines that any of the optical elements in the amplifier unit failed.

In this manner, in the conventional optical element monitoring system, failure of the optical element is monitored based on only the incremental amount of drive current. Therefore, whether output drop is caused due to the failure of optically active light emitting element or the failure of optical passive elements such as the filter 218 and optical coupler 204 cannot be determined.

SUMMARY OF THE INVENTION

Therefore, an object of the present invention is to provide a method and apparatus for monitoring an optical amplifier to inform that an optically active element or a group of optically passive elements is in a trouble state.

Another object of the present invention is to provide a method and optical communication network in which an optical amplifier is monitored and the monitoring result is transmitted so that the network can be readily maintained.

According to a first aspect of the objects, a monitoring system according to the present invention includes an optical amplifier including at least one optically active element, a group of optically passive elements, for amplifying an input optical signal, the group of optically passive elements including a rare earth element doped optical fiber, a first monitoring section for monitoring an intensity of light emitted from the optically active element to generate a first monitor signal indicative of an intensity of light emitted from the optically active element, a second monitoring section for monitoring the optical fiber to generate a second monitor signal indicative of whether a higher optical amplification is required, and a determining section for determining which of the optically active element and the group of optically passive elements is in a trouble state, based on the first monitor signal from the first monitoring section and the second monitor signal from the second monitoring section.

According to another aspect of the objects, a method of monitoring an optical amplifier in an optical communication system, includes the steps of:

amplifying an optical signal in response to a drive current by an optical amplifier which comprises at least one optically active element and a group of optically passive elements including a rare earth element doped optical fiber;

monitoring an intensity of light emitted from the optically active element to generate a first monitor signal indicative of an intensity of light emitted from the optically active element;

monitoring said optical fiber for an optical amplification of the optical amplifier;

supplying said drive current to the optical amplifier based on the second monitor signal; and determining the states of the optically active element and the group of optically passive elements, based on the first monitor signal and a second monitor signal corresponding to the drive current.

According to further another aspect of the objects, an optical communication network includes a plurality of stations including a managing station, an optical fiber network, and a plurality of optical amplifier units each of which includes a monitoring unit, is provided in the optical fiber network, and assigned to an identifier, and wherein each of the plurality of optical amplifier units includes an optical amplifier including at least one optically active element, a group of optically passive elements, for amplifying an input optical signal, the group of optically passive elements including a rare earth element doped optical fiber, a first monitoring unit for monitoring an intensity of light emitted from the optically active element to generate a first monitor signal indicative of an intensity of light emitted from the optically active element, a second monitoring unit for monitoring the optical fiber to generate a second monitor signal indicative of whether a higher optical amplification is required, a determining unit for determining which of the optically active element and the group of optically passive elements is in a trouble state, based on the first monitor signal from the first monitoring unit and the second monitor signal from the second monitoring unit, and a transmitting unit for transmitting the trouble states with the identifier to the managing station, and wherein the managing station includes means for storing the trouble states transmitted from the plurality of optical amplifier units and displaying the stored trouble states.

The trouble states may indicate the failure of the optically active element or any of the group of optically passive elements, or may indicate the failure or degradation of the optically active element or any of the group of optically passive elements.

DESCRIPTION OF THE PREFERRED EMBODIMENTS

A monitoring system of an optical signal amplifier unit used in an optical communication system according to the present invention will be described below with reference to the accompanying drawings.

Figure 1:
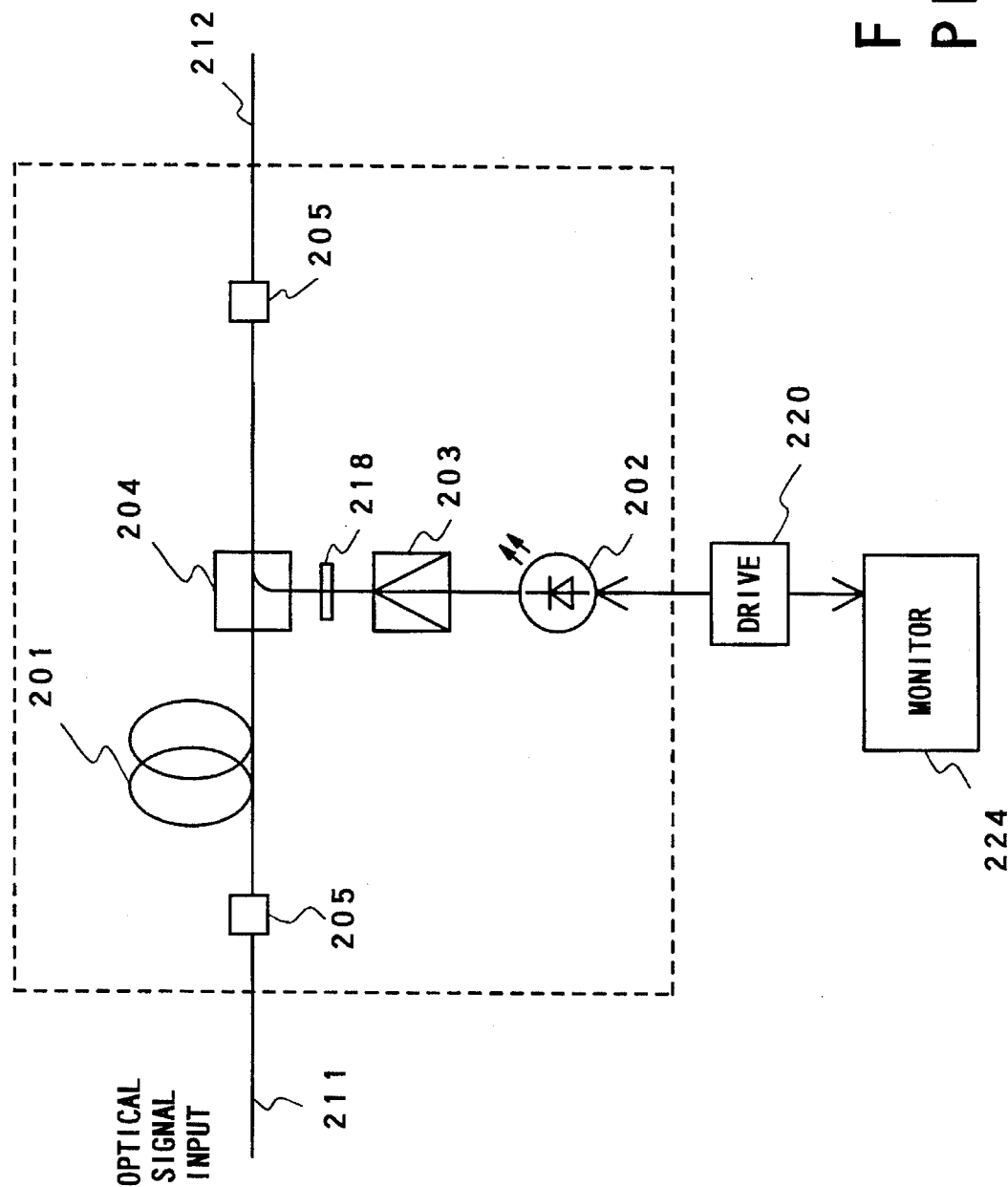
FIG. 1 is a block diagram showing a conventional optical amplifier monitoring apparatus.
Figure 2:
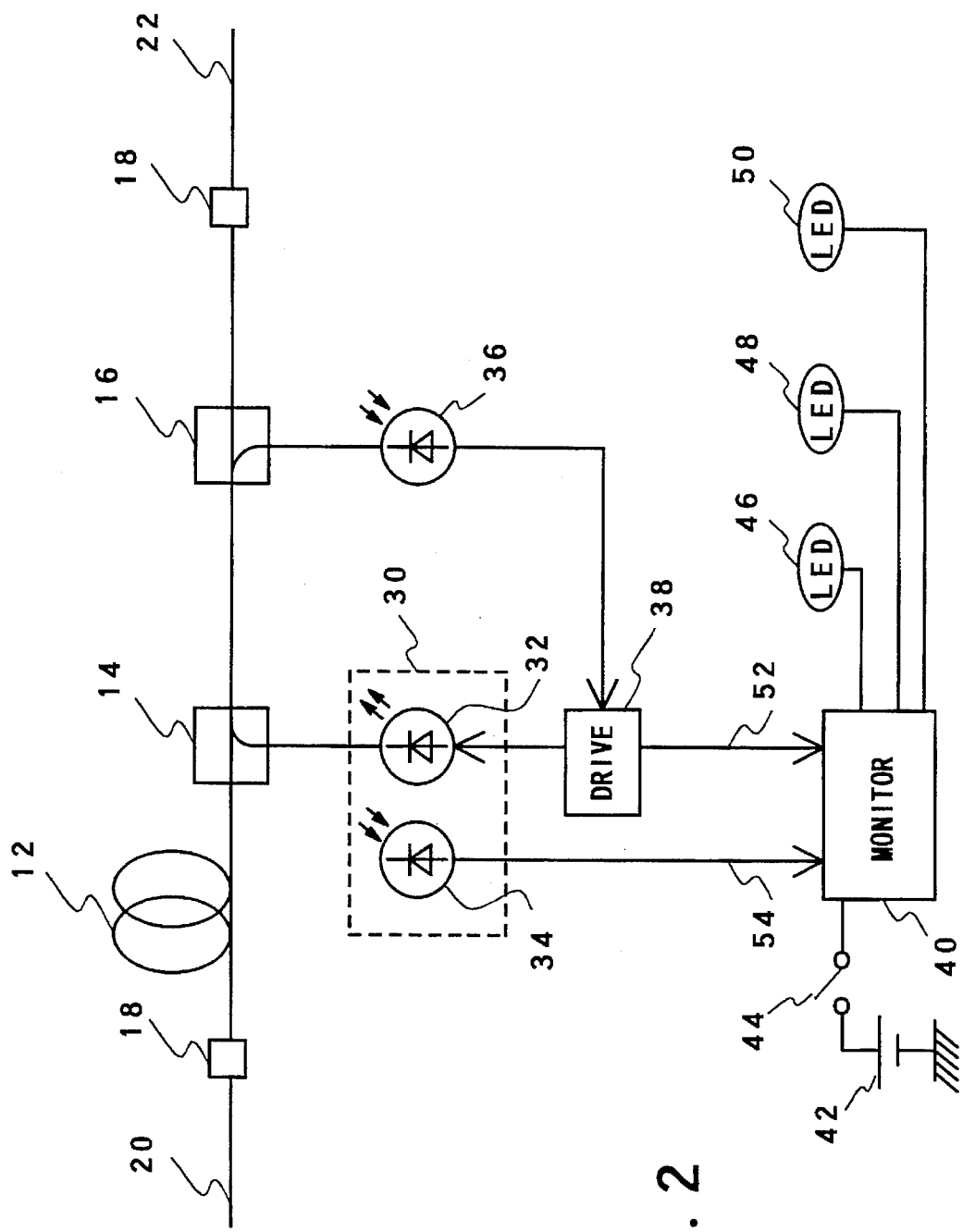
FIG. 2 is a block diagram showing an optical amplifier monitoring apparatus according to an embodiment of the present invention.

FIG. 2 is a block diagram showing the monitoring system according to an embodiment of the present invention. Referring to FIG. 2, the monitoring system mainly includes an optical signal amplifying section and a monitoring section. The optical signal amplifying section includes a light source 32 such as a semiconductor laser for emitting light in response to an input drive current, an optical fiber 12, and an optical coupler 14 for introducing the light emitted from the light source 32 into the optical fiber 12. The optical signal amplifying section may be further provided with an optical amplifier as disclosed in the above-mentioned JP-A-Hei 4-1614. An optical isolator (not shown) is preferably provided between the light source 32 and the optical coupler 14. Alternatively, a light source with an optical filter may be used as disclosed in the Japanese Laid Open Patent Disclosure (JP-A-Hei4-277687). The optical fiber 12 is added or doped with rare earth element such as neodymium (Nd) and erbium (Er) and has the function to amplify an input optical signal. The characteristics of Nd- or Er-doped optical fiber are shown in the above-mentioned JP-A-Hei3-7917. The optical fiber 12 is connected to normal or undoped optical fibers 20 and 22 via filters 18. The filters 18 are provided to prevent the light from the light source 32 from being transferred to the optical fibers 20 and 22. The optical signal amplifying section also includes an optical brancher 16 to retrieve a part of the light in the optical fiber 12, and an optical detector 36 to detecting the intensity of retrieved part of the light. A photodiode is used as the optical detector 36 in the embodiment. The optical detector 36 monitors the amplification of an optical signal by the optical fiber 12 to generate an amplification indication signal indicative of whether or not the amplification is to be increased. The amplification indication signal of the detector 36 is supplied to a drive circuit 38 of the optical signal amplifying section. The drive circuit 38 supplies the drive current to the light source 32 based on the amplification indication signal from the detector 36. More specifically, the drive circuit 38 increases the drive current when the detected light intensity by the detector 36 is lower then a predetermined level and decreases the drive current when it is higher than the predetermined level, i.e., drives the light source 32 such that the amplification of the optical signal input to the optical fiber 12 is constant. The drive circuit 38 further generates a drive current level signal 52 indicative of the level of drive current.

The monitoring section includes an optical detector 34 such as a photodiode for detecting the intensity of light emitted from the light source 32 to generate a light intensity signal 54. The light source 32 and the detector 34 may be constituted as a pair 30. The monitoring section also includes a monitor circuit 40 for determining any failure of elements in the optical signal amplifying section based on the light intensity signal 54 from the detector 34 and the drive current level signal 52 from the drive circuit 38 to drive transistors 70-1, 70-2 and 70-3 (to be described later) indicative of the operating states of the optical signal amplifying section. Indicators 46, 48, and 50 such as LEDs are driven in response to the generated signals, respectively. The red indicator 46 indicates the failure of any of a group of optical passive elements such as the optical coupler 14, the optical fiber 12, and the optical brancher 16, and the red indicator 48 indicates the failure of optically active elements such as the light source 32. The green indicator 50 indicates that the optical signal amplifying section is in a normal state. The monitoring section may be further provided with a power supply 42 and a switch 44 which is provided to enable the monitor circuit 40 to indicate the state of the optical signal amplifying section when the switch 44 is closed and to save power consumption otherwise.

Figure 3:
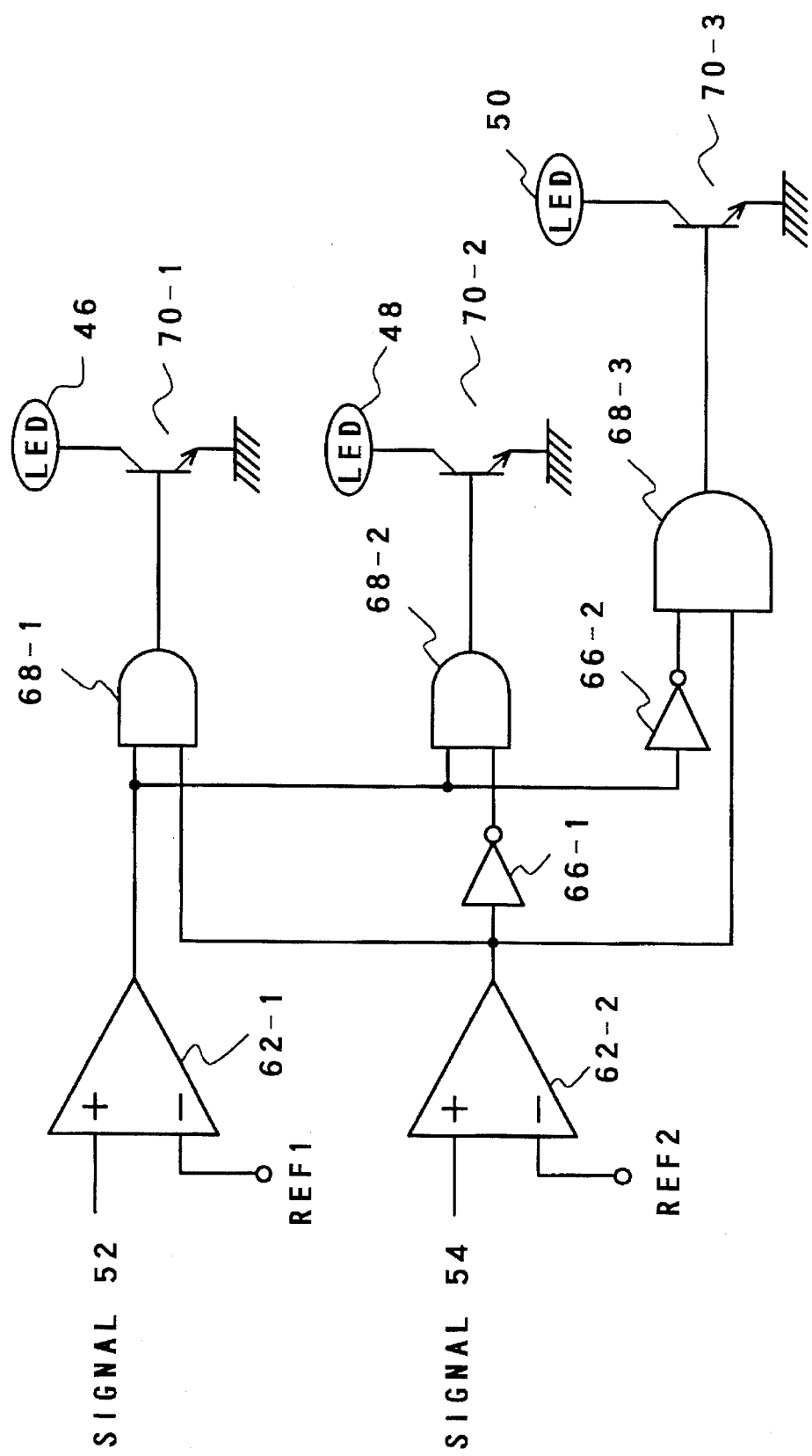
FIG. 3 is a block diagram showing an example of a monitoring circuit shown in FIG. 2.

Referring to FIG. 3, the monitor circuit 40 includes comparators 62-1 and 62-2, inverters 66-1 and 66-2 and AND gates 68-1, 68-2 and 68-3. The comparator 62-1 compares the drive current level signal 52 and a first predetermined level REF1 and output the comparing result to the AND gates 68-1 and 68-2 and the inverter 66-2. The comparator 62-2 compares the light intensity signal 54 and a second predetermined level REF2 and output the comparing result to the AND gates 68-1 and 68-3 and the inverter 66-1. The AND gate 68-1 calculates the logical product of the outputs of the comparators 62-1 and 62-2 to generate a drive signal indicative of the failure of any of the group of optical passive elements in the optical signal amplifying section for driving the transistor 70-1 to drive the indicator 46. The AND gate 68-2 calculates the logical product of the output of comparator 62-1 and the output of inverter 66-1 to generate a drive signal indicative of the failure of any of optically active element in the optical signal amplifying section, i.e., a light source in the embodiment, for driving the transistor 70-2 to drive the indicator 48. The AND gate 68-3 calculates the logical product of the output of the comparator 62-2 and the output of the inverter 66-2 to generate a drive signal indicative of no failure of any of active and passive elements in the optical signal amplifying section, for driving the transistor 70-3 to drive the indicator 50.

Next, the operation of the monitoring system will be described below. The drive circuit 38 generates and supplies a drive current to the light source 32. The light source 32 emits light in response to the drive current from the drive circuit 38 and the light is directed into the optical fiber 12 with, for example, Er doped via the optical coupler 14 to excite the optical fiber 12. The frequency of the light emitted from the light source 32 is determined based on the characteristic of the optical fiber 12. A part of light emitted from the light source 32 is detected by the optical detector 34 which generates the light intensity signal 54 based on the detected result to supply the monitor circuit 40. An optical signal input through the optical fiber 20 is amplified in the optical fiber 12 excited by the light source 32. A part of the light in the optical fiber 12 is separated by the optical brancher 16 and irradiated to the optical detector 36 via an optical band pass filter (not shown). The detector 36 generates a signal indicative of the intensity of the separated light part, i.e., the amplification of the optical fiber 12 to supply to the drive circuit 38. The drive circuit 38 generates a new drive current based on the detecting result of the detector 36. Also, the drive circuit 38 generates the drive current level signal 52 and supply to the monitor circuit 40.

When the signal 52 is lower than the first predetermined level REF1, i.e., the light source 32 is driven with a low level of drive current, and when the signal 54 is higher than the second predetermined level REF2, i.e., the light having sufficient intensity is emitted from the light source 32, the drive signal is generated by the AND gate 68-3 to be supplied to the transistor 70-3 so that the green indicator 50 is turned on. This means that the optically active and passive elements are in a normal state. When the signal 52 is higher than the first predetermined level REF1, i.e., the light source 32 is driven with a high level of drive current, and when the signal 54 is higher than the second predetermined level REF2, the drive signal is generated by the AND gate 68-1 to supplied to the transistor 70-1 so that the red indication 46 is turned on. This means that the optically active element is in the normal state but any of the optically passive elements are in a failure state. When the signal 52 is higher than the first predetermined level REF1, and when the signal 54 is lower than the second predetermined level REF2, i.e., the light having sufficient intensity is not emitted from the light source 32, the drive signal is generated by the AND gate 68-2 to be supplied to the transistor 70-2 so that the red indictor 48 is turned on. This means that the optically passive elements are in the normal state but the optically active element is in the failure state.

If the monitoring system is installed at a location where nobody is present, the indication is unuseful. In this ease, therefore, the switch 44 is normally opened. A serviceman closes the switch 44 to check the operation state of the optical signal amplifying section. Thereby, wasted power consumption can be avoided.

In the above embodiment, the drive current level signal 52 is used to monitor the states of optical elements. However, the output of the optical detector 36 may be used for monitoring the states of optical elements instead of the drive current level signal 52 if the output of the optical detector 36 is inverted. The same result could be obtained.

Next, a modification of the monitor circuit 40 will be described below with reference to FIG. 4. In this example, the failure state and degradation states of optical elements in the optical amplifier unit are monitored. Here, the degradation state of an optical element means that the optical element can be yet used in practice but the performance dropped in such a manner that the replacement would be required in the near future.

Figure 4:
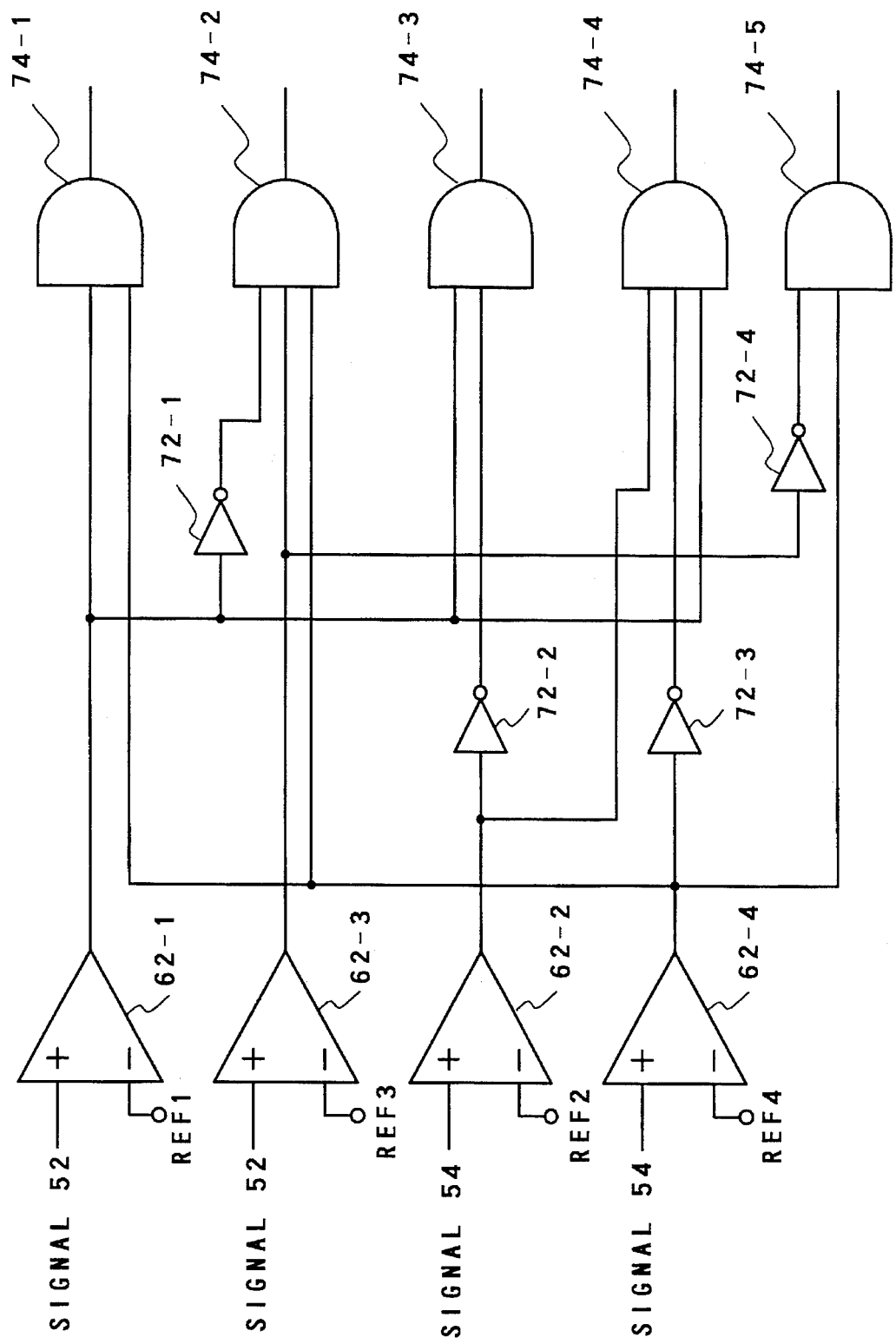
FIG. 4 is a block diagram showing another example of the monitoring circuit shown in FIG. 2.

Referring to FIG. 4, the monitor circuit 40 includes comparators 62-1 to 62-4, inverters 72-1 to 72-4 and AND gates 74-1 to 74-5. The comparator 62-1 compares the drive current level signal 52 and a first predetermined level REF1 and outputs the comparing result to the AND gates 74-1, 74-3 and 74-4 and the inverter 72-1. The comparator 62-2 compares the light intensity signal 54 and a second predetermined level REF2 and outputs the comparing result to the AND gate 74-4 and the inverter 72-2. The comparator 62-3 compares the drive current level signal 52 and a third predetermined level REF3 lower than the REF1 and outputs the comparing result to the AND gate 74-2 and the inverter 72-4. The comparator 62-4 compares the light intensity signal 54 and a fourth predetermined level REF4 higher than REF2 and outputs the comparing result to the AND gates 74-1, 74-2, and 74-5 and the inverter 72-3. The AND gate 74-1 calculates the logical product of the outputs of the comparators 62-1 and 62-4 to generate a drive signal indicative of the failure of any of the group of optical passive elements in the optical signal amplifying section. The AND gate 74-2 calculates the logical product of the outputs of comparator 62-3 and 62-4 and the output of inverter 72-1 to generate a drive signal indicative of the degradation of any of the group of optically passive elements in the optical signal amplifying section. The AND gate 74-3 calculates the logical product of the output of the comparator 62-1 and the output of inverter 72-2 to generate a drive signal indicative of the failure of optically active element, e.g., the light source 32 in this embodiment. The AND gates 74-4 calculates the logical product of the outputs of comparator 62-1 and 62-2 and the output of inverter 72-3 to generate a drive signal indicative of the degradation of optically active element. The AND gate 74-5 calculates the logical product of the output of the comparator 62-4 and the output of the inverter 72-4 to generate a drive signal indicative of no failure of any of active and passive elements in the optical signal amplifying section.

When the signal 52 is lower than the third predetermined level REF3, i.e., the light source 32 is driven with a low level of drive current, and when the signal 54 is higher than the fourth predetermined level REF4, i.e., the light having sufficient intensity is emitted from the light source 32, the AND gate 74-5 generates an output of high level. This means that the optically active and passive elements are in a normal state. When the signal 52 is higher than the first predetermined level REF1, i.e., the light source 32 is driven with a high level of drive current, and when the signal 54 is higher than the fourth predetermined level REF4, the AND gate 74-1 supplies an output of high level. This means that the optically active element is in the normal state but any of the optically passive elements are in a failure state. When the signal 52 is higher than the third predetermined level REF3 but lower than the first predetermined level REF1, i.e., the light source 32 is driven with a relatively high level of drive current, and when the signal 54 is higher than the fourth predetermined level REF4, the AND gate 74-2 supplies an output of high level. This means that the optically active element is in the normal state but any of the optically passive elements are in a degradation state. When the signal 52 is higher than the first predetermined level REF1, and when the signal 54 is lower than the second predetermined level REF2, i.e., the light having sufficient intensity is not emitted from the light source 32, the AND gate 74-3 supplies an output of high level. This means that the optically passive elements are in the normal state but the optically active element is in the failure state. When the signal 52 is higher than the first predetermined level REF1, and when the signal 54 is higher than the second predetermined level REF2 but lower than the fourth predetermined level REF4, i.e., the light is emitted from the light source 32 but the intensity is not so much high, the AND gate 74-4 supplies an output of high level. This means that the optically passive elements are in the normal state but the optically active element is in the degradation state. The outputs of AND gates 74-1 to 74-5 may be supplied to transistors to drive indicators, as in the above embodiment.

Figure 5:
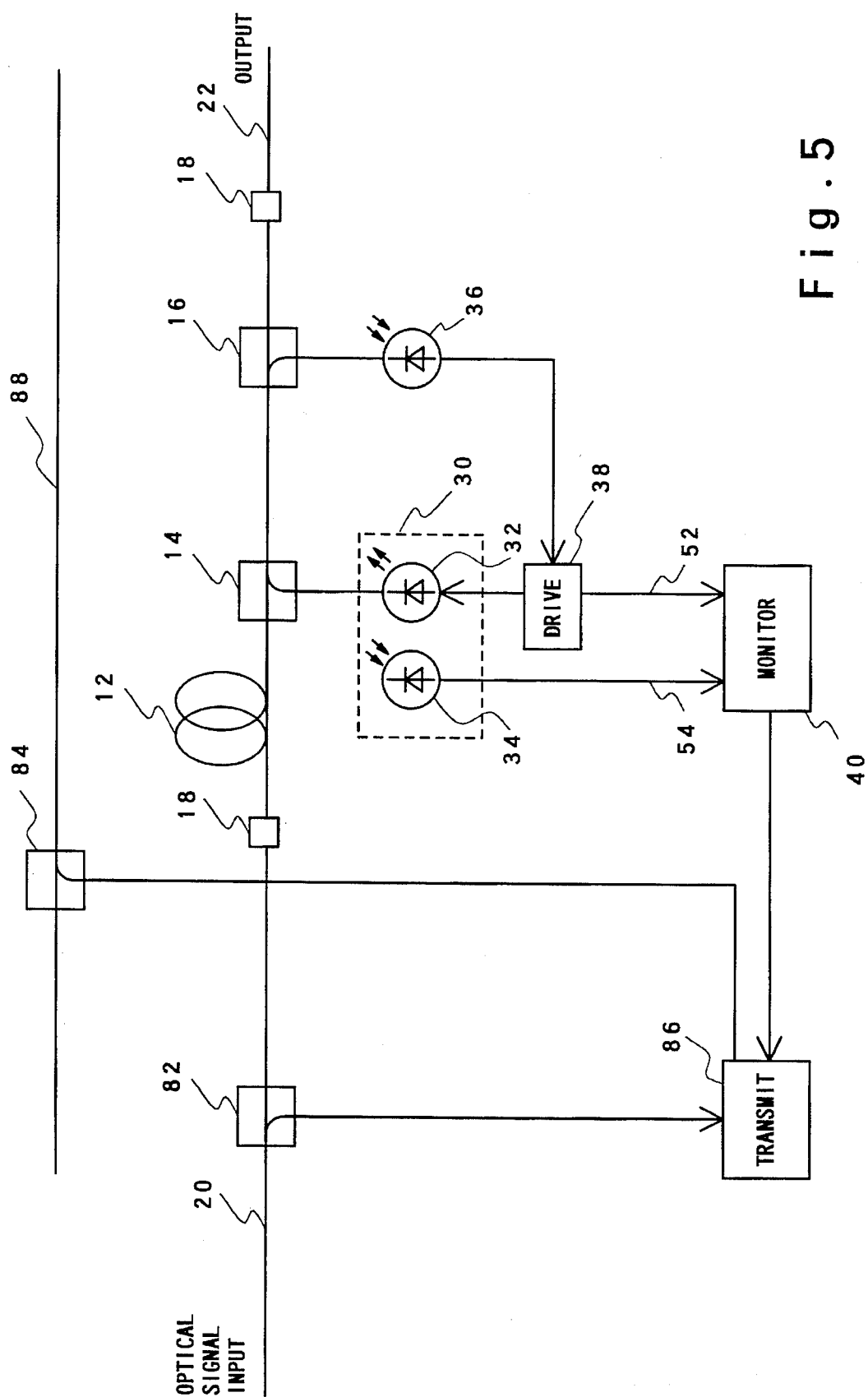
FIG. 5 is a block diagram showing the optical amplifier monitoring apparatus according to another embodiment of the present invention.

Next, an optical communication network to which the monitoring system according to the present invention is applied will be described below with reference to FIGS. 5 to 7. In this embodiment, the monitor system is assigned with an identifier.

Figures 6, 7:
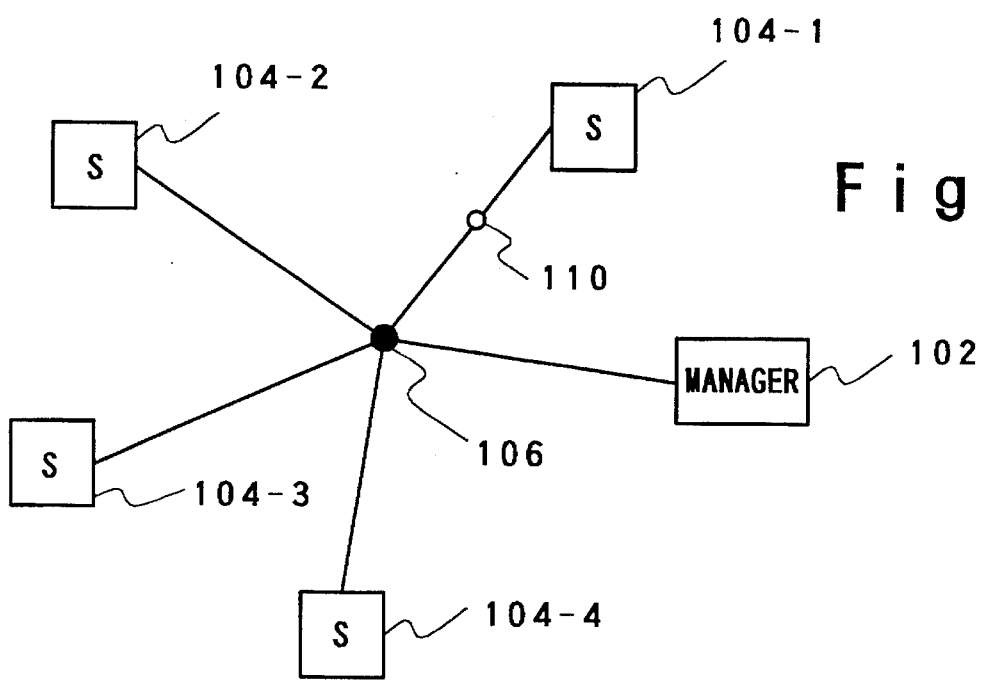
FIG. 6 is a block diagram showing an example of optical network to which the optical amplifier monitoring apparatus shown in FIG. 5 is applied.
FIG. 7 is a diagram showing the output of a network manager in the optical network shown in FIG. 6.

FIG. 6 shows an example of optical communication network to which the monitoring system according to the present invention is applied. The optical network includes a network manager 102, stations 104-1 to 104-4 which are connected to each other via an optical star coupler 106 by optical fibers. It is assumed that a serviceman is present in the network manager 102. The optical signal amplifier units including the monitoring system are located at the star coupler 106 or at relay nodes on the optical fibers such as a relay node 110. The network manager includes a processor having a memory, a display unit, and an input unit.

Next, each of the monitoring systems will be described with reference to FIG. 5. The optical signal amplifying section and the monitoring section in the monitoring system are the same as those in the above embodiment shown in FIG. 2. Therefore, the description will be omitted. Referring to FIG. 5, the embodiment further includes a transmitting section. More particularly, the transmitting section includes an optical brancher 82 provided on the optical fiber 20, a transmitting circuit 86, and an optical coupler 84 provided on an optical fiber 88 for transmission.

Next, the operation will be described below. A state transmission request is issued and transmitted to the monitoring system shown in FIG. 5 from a processor of the network manager 102. The state transmission request is issued at an arbitrary timing or manually by the serviceman via the input unit. When the request is issued, the monitoring circuit 86 of the monitoring system receives the request through the optical fiber 20 via the optical brancher 82. The transmitting circuit 86 reads out of the monitor circuit 40 the states of the optical elements, i.e., the failure states or degradations states of the optically active element or group of optically passive elements and transmits the read out states data to the network manager 102 through the optical coupler 84 and the optical fiber 88 together with the identifier assigned to the monitoring system itself. In this case, collision of transmission data should be avoided on the network and the monitoring system performs the control for avoidance of such collision. The control is well known to a person skilled in the art and therefore the description of the structure and operation will be omitted.

In the network manager 102, the processor stores the transmitted state data in the memory, classifies the stored data into two groups, degradation data group and failure data group. The classified data groups are displayed on the display unit as shown in FIG. 7. In FIG. 7, the numbers such as "10001", "10010" are the identifiers assigned to the monitoring systems in the network, and "P" and "A" indicate the group of optically passive elements and optically active element. Therefore, "FAILURE" and "10010 A" mean that an optically active element is in the failure state in a monitoring system having the identifier "10010" and immediate repair is necessary. In the "DEGRADATION", "15300 A" means that an optically active element is in the degradation state in a monitoring system having the identifier "15300" and maintenance would be required in the near future. Thus, servicemen can be distributed efficiently.

In the above embodiment, the state data is transmitted through the optical fiber 88. The optical fiber 88 may be either a dedicated fiber or channel, or a general fiber or channel. Also, the state data may be transmitted to the network manager 102 by use of another type of line or RF.

Further, the state transmission request is issued from the network manager periodically or at an arbitrary time automatically or manually by the serviceman. However, the monitoring system may transmit the state data periodically or at the time when the failure or degradation state is caused, without the state transmission request. In this case, the optical brancher 82 can be omitted.

The classifying method between the failure state and the degradation state is not limited to the above-mentioned method. Other criteria may be employed.

What is claimed is:

1. A monitoring system in an optical communication system, comprising:

an optical amplifier including at least one optically active element, a group of optically passive elements, for amplifying an input optical signal, said group of optically passive elements including a rare earth element doped optical fiber and said optically active element being driven in response to a drive current;

first monitoring means for monitoring an intensity of light emitted from said optically active element to generate a first monitor signal indicative of an intensity of light emitted from said optically active element;

second monitoring means for monitoring an amplification of said optical fiber, supplying the drive current to said optically active element in accordance with the monitoring result of the amplification, and generating a second monitor signal indicative of a level of the drive current; and determining means for determining that each of said optically active element and said group of optically passive elements is in either a degradation state or a failure state, based on the first monitor signal from said first monitoring means and the second monitor signal from said second monitoring means.

2. The monitoring system according to claim 1, further comprising transmitting means for automatically transmitting the determined results of said determining means when the degradation state or the failure state of said optically active element or any of said group of optically passive elements is determined by said determining means.

3. The monitoring system according to claim 2, wherein said determining means includes means for determining that any of said optically passive elements is in the degradation state when said first monitor signal indicates that the intensity of the light emitted from said optically active element is sufficient and when said second monitor signal indicates that the amplification is required to be increased, for determining that any of said optically passive elements is in the failure state when said first monitor signal indicates that the light intensity from said optically active element is sufficient and when said second monitor signal indicates that the amplification is required to be further increased, for determining that said optically active element is in the degradation state when said first monitor signal indicates that the light intensity from said optically active element is sufficient and when the second monitor signal indicates that the drive current has been increased, and for determining that said optically active element is in the failure state when said first monitor signal indicates that the light intensity from said optically active element is insufficient and when said second monitor signal indicates that the drive current is to be further increased.

4. The monitoring system according to claim 3, wherein said determining means comprises:

first comparing means for comparing said second monitor signal with a first predetermined level to generate a first comparison signal when said second monitor signal is higher than the first predetermined level;

second comparing means for comparing said second monitor signal with a second predetermined level lower than the first predetermined level to generate a second comparison signal when said second monitor signal is higher than the second predetermined level;

third comparing means for comparing said first monitor signal with a third predetermined level to generate a third comparison signal when said first monitor signal is higher than the third predetermined level;

fourth comparing means for comparing said first monitor signal with a fourth predetermined level higher than the third predetermined level to generate a fourth comparison signal when said first monitor signal is higher than the fourth predetermined level;

first determining means for determining that any of said optically passive elements is in the failure state, based on said first and fourth comparison signals being active;

second determining means for determining that any of said optically passive elements is in the degradation state, based on said first comparison signal being inactive, said second comparison signal being active, and said fourth comparison signal being active;

third determining means for determining that said optically active element is in the failure state, based on said third comparison signal being inactive and said first comparison signal being active; and fourth determining means for determining that said optically active element is in the degradation state, based on said first comparison signal being active, said third comparison signal being active, and said fourth comparison signal being inactive.

5. The monitoring system according to claim 1, further comprising means for selectively operating said determining means.

6. A method of monitoring an optical amplifier in an optical communication system, comprising the steps of:

amplifying an optical signal in response to a drive current by an optical amplifier which comprises at least one optically active element and a group of optically passive elements including a rare earth element doped optical fiber;

monitoring an intensity of light emitted from said optically active element to generate a first monitor signal indicative of an intensity of light emitted from said optically active element;

monitoring said optical fiber for an optical amplification of said optical amplifier and generating a second monitor signal based thereon;

supplying said drive current to said optical amplifier based on said second monitor signal;

determining states of said optically active element and said group of optically passive elements, based on said first monitor signal and said second monitor signal; and automatically transmitting the determined state when it is determined that said optically active element and any of said group of optically passive elements are in a degradation state or a failure state.

7. The method according to claim 6, wherein said determining step comprises the steps of:

determining that any of said optically passive elements is in the failure state when said first monitor signal indicates that said optically active element emits the light having an intensity higher than a first predetermined level and when said second monitor signal indicates that amplification higher than a second predetermined level is required; and determining that said optically active element is in the failure state when said first monitor signal indicates that said optically active element does not emit the light having an intensity higher than the first predetermined level and when said second monitor signal indicates that amplification higher than the second predetermined level is required.

8. The method according to claim 6, wherein said determining step comprises the steps of:

determining that any of said optically passive elements is in the degradation state when said first monitor signal indicates that the intensity of the light emitted from said optically active element is sufficient and when said second monitor signal indicates that the amplification is required to be increased;

determining that any of said optically passive elements is in the failure state when said first monitor signal indicates that the light intensity from said optically active element is sufficient and when said second monitor signal indicates that the amplification is required to be further increased;

determining that said optically active element is in the degradation state when said first monitor signal indicates that the light intensity from said optically active element is sufficient and when the second monitor signal indicates that the drive current has been increased; and determining that said optically active element is in the failure state when said first monitor signal indicates that the light intensity from said optically active element is insufficient and when said second monitor signal indicates that the drive current is to be further increased.

9. An optical communication network comprising:

a plurality of stations including a managing station;

an optical fiber network; and a plurality of optical amplifier units each of which includes a monitoring unit, is provided in the optical fiber network, and has an identifier, wherein each of said optical amplifier units comprises:

an optical amplifier including at least one optically active element, a group of optically passive elements, for amplifying an input optical signal, said group of optically passive elements including a rare earth element doped optical fiber;

first monitoring means for monitoring an intensity of light emitted from said optically active element to generate a first monitor signal indicative of an intensity of light emitted from said optically active element;

second monitoring means for monitoring said optical fiber to generate a second monitor signal indicative of whether a higher optical amplification is required;

determining means for determining whether said optically active element and any of said group of optically passive elements are in a trouble state, based on the first monitor signal from said first monitoring means and the second monitor signal from said second monitoring means; and transmitting means for transmitting the trouble state with the identifier corresponding to the optical amplifier unit to said managing station, wherein said managing station comprises means for storing the trouble states transmitted from said plurality of optical amplifier units and displaying the stored trouble states.

10. The optical communication network according to claim 9, wherein said managing station issues a state transmission request to each of said optical amplifier units, and wherein each of said optical amplifier units transmits the trouble states with the identifier to said managing station in response to the state transmission request.

11. The optical communication network according to claim 9, wherein each of said optical amplifier units periodically transmits the trouble states with the identifier to said managing station.

12. The optical communication network according to claim 9, wherein said trouble states indicate the failure of the optically active element or any of the optically passive elements.

13. The optical communication network according to claim 9, wherein said trouble states indicate the failure or degradation of the optically active element or any of the optically passive elements.

* * * * *